April 7, 1970  S. A. YOUNG  3,504,383
WASTE CONNECTION SEAL
Filed Oct. 26, 1967

INVENTOR.
STEPHEN A. YOUNG
BY
Robb+Robb
attorneys

United States Patent Office 3,504,383
Patented Apr. 7, 1970

3,504,383
WASTE CONNECTION SEAL
Stephen A. Young, Monticello, Ind.
(% Stephen A. Young Corporation, Flora, Ind. 46929)
Filed Oct. 26, 1967, Ser. No. 678,376
Int. Cl. F16l 27/12; E03c 1/00
U.S. Cl. 4—191                              1 Claim

ABSTRACT OF THE DISCLOSURE

This invention relates to seal construction particularly for bathtub drains which will facilitate the installation of a bathtub and connection of the drain extending therefrom without requiring that the plumber build a special access opening for access to the drain connection which is normally required because of the necessity heretofore of either soldering the connection together or drawing up a slip-nut arrangement of some kind. Specifically the invention contemplates the use of a seal arrangement which is manipulated upon installation of the bath drain alone, not requiring any further attention by the plumber since the seal effected upon introduction of the connecting parts is positive by reason of the construction thereof, and requires no further adjustment or contact by the plumber. The arrangement can obviously be used in other places where accessibility is so reduced as to make the same desirable or where the cost of making such connection combined with accessibility makes the connection of this invention desirable and useful.

In bath drain connection as presently contemplated, it is usually necessary for a plumber to have access to a point beneath the tube by the drain so that he can effect soldering of the tail piece of the bathdrain with the upwardly extending drain tubing, particularly where copper tubing has heretofore been used, and even where a slip-nut arrangement has been used heretofore, access is obviously required in order to use a wrench to draw up the slip-nut and effect a tight seal.

The invention herein contemplated obviates the necessity for further attention by the plumber once the drain is emplaced with the tail piece thereof introduced into the drain tubing which extends up from the floor whether the drain tubing be fixed in a concrete floor or otherwise extends from a trap as is usually the case.

It is therefore a principal object of this invention to provide for the necessary seal between a bath drain or the like and a tube which is directed to the sewer so that no further attention is required by way of sealing operation than the mere introduction of the tail piece into the drain tubing.

Another object of the invention is to so arrange the seal on a bath drain that the same may be readily introduced into a drain tube and to provide an O-ring seal on the end of the tail piece on the bath drain of such a form and of such dimensions as will effect the necessary seal upon the mere introduction of the same into the drain tubing without more.

Another object of the invention is to so arrange the dimensions of the tail piece and provide for the introduction of the same and the seal carried thereon into the drain tube as to facilitate ready emplacement of removal from the position desired without either soldering or using a wrench on a slip-nut arrangement.

Other and further objects of the invention will be understood from a consideration of the specification appended hereto and shown in the drawing wherein.

Figure 1:
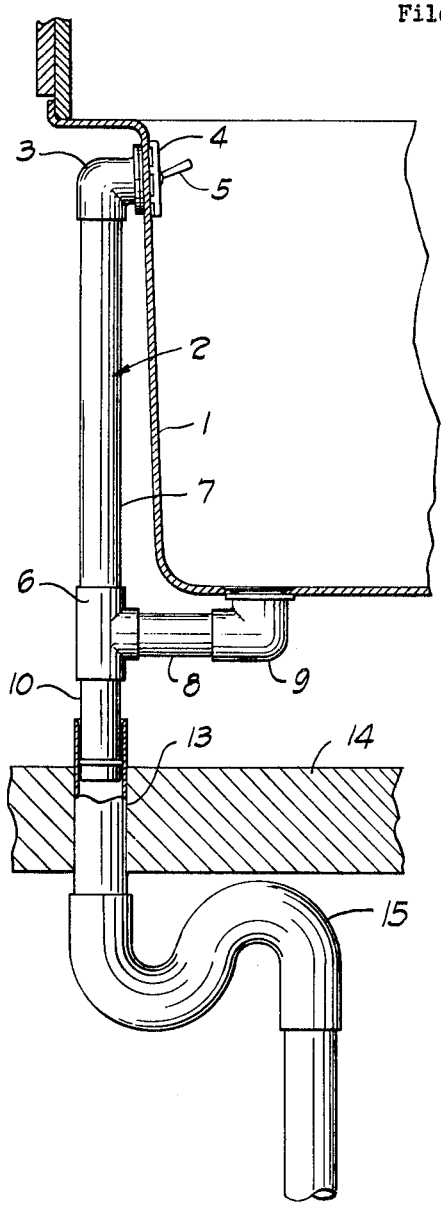
FIGURE 1 is a fragmentary view, partly in section, showing a typical bath drain installation, and in detail the arrangement of the sealing connection with the drain tubing.

Referring now to FIGURE 1, as exemplary of the instant invention, there is illustrated a bathtub generally denoted 1, this being in section and only partially illustrated to indicate the positioning thereon of a bath drain generally denoted 2 with the overflow head at 3 in alignment with the overflow face plate 4 and control member 5 mounted therein.

A drain T at 6 is connected to the overflow arm 7 and likewise to the waste arm 8 at the extremity of which is the drain waste or drain head 9 in alignment with the drain outlet for the tub 1.

Figure 2:
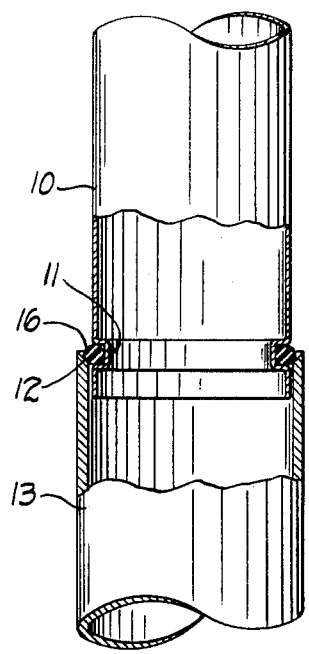
FIGURE 2 is a large fragmentary sectional view showing in greater detail the arrangement of the seal in the tail piece as same is being introduced into the drain tube.

From the bottom of the drain T 6, extends a tail piece 10, the lower end of the tail piece being formed with a groove more particularly shown in FIGURE 2, and indicated at 11 of suitable dimension to receive therewithin a sealing ring which is preferably an O-ring such as 12.

The tail piece 10 will usually be of a nominal outside diameter of 1½" and the O-ring 12 will extend beyond such diameter sufficient distance to provide a sealing interengagement with the drain tube 13, the drain tube 13 is under most conditions positioned in a concrete sub floor 14, and thus fixed with relation thereto and extending upwardly therefrom.

The drain tube 13 leads at its lower extremity to a trap suggested at 15 of conventional form and necessarily conventionally connected to such trap 15.

The drain tube 13 is provided at its upper end with an inwardly extending chamfer 16, the inner diameter of the drain tube being on the order of 1½" or sufficiently larger than the tail piece diameter 10, so that the tail piece 10 will slip into such drain tube 13.

By reason of the extension of the O-ring 12 beyond the outer surface of the tail piece 10, and contact made by slipping into the interior of the drain tube 13 and downwardly, an effective seal as between the two tubes to prevent undesired escape of waste water.

In the normal installation of a drain of this general description, it has heretofore been necessary for the plumber to solder the tail piece in the drain tube 13 to effect the necessary sealing operation and this of course requires that sufficient space be provided, something which is often very difficult and at the very least necessitates additional amount of time on the part of the plumber to effect.

Under other conditions, there have been provided the usual slip-nut and slip-nut seal which requires similar access for the plumber to manipulate a wrench and thereby tighten up the respective parts to prevent leakage therebetween.

It is obvious that by provision of the instant invention that the sealing operation between the tail piece 10 and the drain tube 13 is such as to overcome all the previous manipulating requirements and not only speed up the installation of the bath drain tube but effectively seal the same and even permit removal of the bath drain under circumstances which require the same with a minimum amount of difficulty.

I claim:

1. In adjustable waste connection seal construction of the class described, in combination, a concealed drain unit mounted at the end of a bathtub, a tail piece extending vertically downwardly from said drain unit, a slip joint seal at the extremity of said tail piece, said seal comprising an O-ring sealingly seated in a groove formed by rolling the tubing comprising the tail piece, the internal diameter of said tail piece at said groove being less than the internal diameter of said tail piece adjacent said groove and a drain tube extending upwardly from a floor receiving said tail piece and seal interiorly thereof for free vertical self-positioning therein, positioning of said tail piece in said drain tube effecting sealed connection of said tail piece and tube, the outside diameter of said O-ring in place being sufficiently large so that said O-ring seals against inside diameter of the drain tube, the end of said drain tube being chamfered inwardly to facilitate introduction of the O-ring thereinto.

References Cited

UNITED STATES PATENTS

| | | | |
|---|---|---|---|
| 2,398,788 | 4/1946 | Hedrick | 285—424 X |
| 2,852,034 | 9/1958 | Shames et al. | 4—191 X |
| 3,223,438 | 12/1965 | De Cenzo | 285—347 X |
| 3,263,678 | 8/1966 | Everston | 4—180 X |
| 936,469 | 10/1909 | Milne | 4—191 X |
| 3,238,538 | 3/1966 | Turner | 285—56 X |

FOREIGN PATENTS

| | | |
|---|---|---|
| 637,025 | 2/1962 | Canada. |
| 978,055 | 12/1964 | Great Britain. |

DAVID J. WILLIAMOWSKY, Primary Examiner

D. W. AROLA, Assistant Examiner

U.S. Cl. X.R.

285—302